(12) United States Patent
Chen

(10) Patent No.: US 9,399,479 B1
(45) Date of Patent: Jul. 26, 2016

(54) CUP HOLDER

(71) Applicant: Right View Limited, Apia (WS)

(72) Inventor: Kuan-Chou Chen, Tainan (TW)

(73) Assignee: Right View Limited, Apia (WS)

( * ) Notice: Subject to any disclaimer, the term of this patent is extended or adjusted under 35 U.S.C. 154(b) by 0 days.

(21) Appl. No.: 14/793,771

(22) Filed: Jul. 8, 2015

(51) Int. Cl.
*B62B 9/00* (2006.01)
*F16B 2/12* (2006.01)
*F16M 13/02* (2006.01)
*A47K 1/09* (2006.01)

(52) U.S. Cl.
CPC ... *B62B 9/00* (2013.01); *A47K 1/09* (2013.01); *F16B 2/12* (2013.01); *F16M 13/022* (2013.01)

(58) Field of Classification Search
CPC .......... F16B 2/12; B62B 9/00; F16M 13/022; A47K 1/09; A47G 223/02; A47G 23/0225; A47G 23/0208; B60N 3/105
USPC ........... 248/311.2, 313, 316.4, 229.22, 228.3, 248/230.3, 231.41, 103, 104, 230.5; 224/558, 407, 414, 448, 548, 551, 926
See application file for complete search history.

(56) References Cited

U.S. PATENT DOCUMENTS

| | | | | |
|---|---|---|---|---|
| 2,517,927 A * | 8/1950 | Reed | ...................... | F41A 23/18 248/231.41 |
| 3,120,308 A * | 2/1964 | Pierro | ...................... | A47C 7/62 211/74 |
| 3,939,986 A * | 2/1976 | Pierro | ...................... | B60N 3/103 108/44 |
| 4,527,696 A * | 7/1985 | Harris | ...................... | B60N 3/103 224/400 |
| 5,149,032 A * | 9/1992 | Jones | .................. | A47G 23/0225 248/154 |
| 5,174,534 A * | 12/1992 | Mitchell | ................ | B60N 3/103 215/395 |
| 5,205,452 A * | 4/1993 | Mankey | .................. | B60R 7/043 224/275 |
| 5,996,957 A * | 12/1999 | Kurtz | .................. | A47G 23/0225 248/231.21 |
| 6,283,042 B1 * | 9/2001 | Wargo | .................... | A47D 1/008 108/26 |
| 6,398,175 B1 * | 6/2002 | Conner | ................. | B25B 1/2405 248/228.3 |
| 7,823,230 B2 * | 11/2010 | Meyers | .................. | A47K 3/003 4/577.1 |
| 8,870,044 B1 * | 10/2014 | Freese | ....................... | F16B 2/12 224/407 |

* cited by examiner

*Primary Examiner* — Kimberly Wood
(74) *Attorney, Agent, or Firm* — Alan D. Kamrath; Kamrath IP Lawfirm, P.A.

(57) ABSTRACT

A cup holder includes a fixed seat, a movable clamping bar and a support rack. When the movable clamping bar is pushed to shorten the distance between the movable clamping plate and the fixed clamping plate, the first locking teeth mesh with the second locking teeth, so that the locking block is disposed at a successively jumping state, and the rail of the baby stroller is sandwiched between the movable clamping plate and the fixed clamping plate. Then, the rotation member is rotated to drive the pull rod which drives the positioning piece to slide into the transverse slot to stop the locking block. When the rotation member is rotated successively, the movable clamping bar performs a micro-adjustment tightening action, so that the rail is clamped between the movable clamping plate and the fixed clamping plate.

5 Claims, 8 Drawing Sheets

CUP HOLDER

BACKGROUND OF THE INVENTION

1. Field of the Invention

The present invention relates to a holder and, more particularly, to a cup holder that can be mounted on a baby stroller.

2. Description of the Related Art

A conventional baby stroller is not provided with a holder to place articles, such as bottles, cups, bowls and the like. Thus, when the user carries the articles outdoors with the baby stroller, there is no space to place the articles, so that the user has to prepare a bag for storing the articles, thereby causing inconvenience to the user when needing to carry and place the articles.

BRIEF SUMMARY OF THE INVENTION

In accordance with the present invention, there is provided a cup holder comprising a fixed seat, a movable clamping bar mounted on the fixed seat, and a support rack mounted on the fixed seat. The fixed seat includes a base, a slide, a locking block, a pull rod, a threaded rod and a rotation member. The base has an end provided with a fixed clamping plate. The base has two sides each provided with a positioning member which has a protruding retaining end. The base has an interior provided with a space which has a bottom provided with a slideway. The slide is mounted on the slideway and has a top provided with a recessed chamber. The locking block is mounted in the chamber of the slide. An elastic member is biased between the locking block and the chamber of the slide to push the locking block upward. The locking block has a top provided with a plurality of first locking teeth. The locking block is provided with a longitudinal slot and a transverse slot. The transverse slot is located at a bottom of and connected to the longitudinal slot. The locking block is transversely provided with a through hole. The pull rod extends through the through hole. A positioning piece is transversely mounted on the pull rod and is movable between the longitudinal slot and the transverse slot. The threaded rod is connected with a distal end of the pull rod. The rotation member is pivotally mounted on the base and has a screw member screwed onto the threaded rod. The movable clamping bar includes a shank having a first end inserted into a top of the space of the base, and a movable clamping plate extending downward from a second end of the shank and facing the fixed clamping plate. The shank has a bottom provided with a plurality of second locking teeth meshing with the first locking teeth of the locking block. The support rack includes a bracket provided with at least one receiving recess and at least one opening. The bracket has two sides each provided with a press button which has a protruding tenon locked onto the retaining end of the respective positioning member of the base.

According to the primary advantage of the present invention, the shank of the movable clamping bar is pushed to sandwich the rail of the baby stroller between the movable clamping plate and the fixed clamping plate, and the rotation member is rotated to drive the positioning piece to lock the locking block, so that the rail is clamped between the movable clamping plate and the fixed clamping plate.

According to another advantage of the present invention, the user only needs to push the movable clamping bar and rotate the rotation member so as to lock the cup holder onto the rail of the baby stroller so that the cup holder is attached to the baby stroller easily, quickly and conveniently.

According to a further advantage of the present invention, the cup holder is mounted on and detached from the baby stroller freely.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
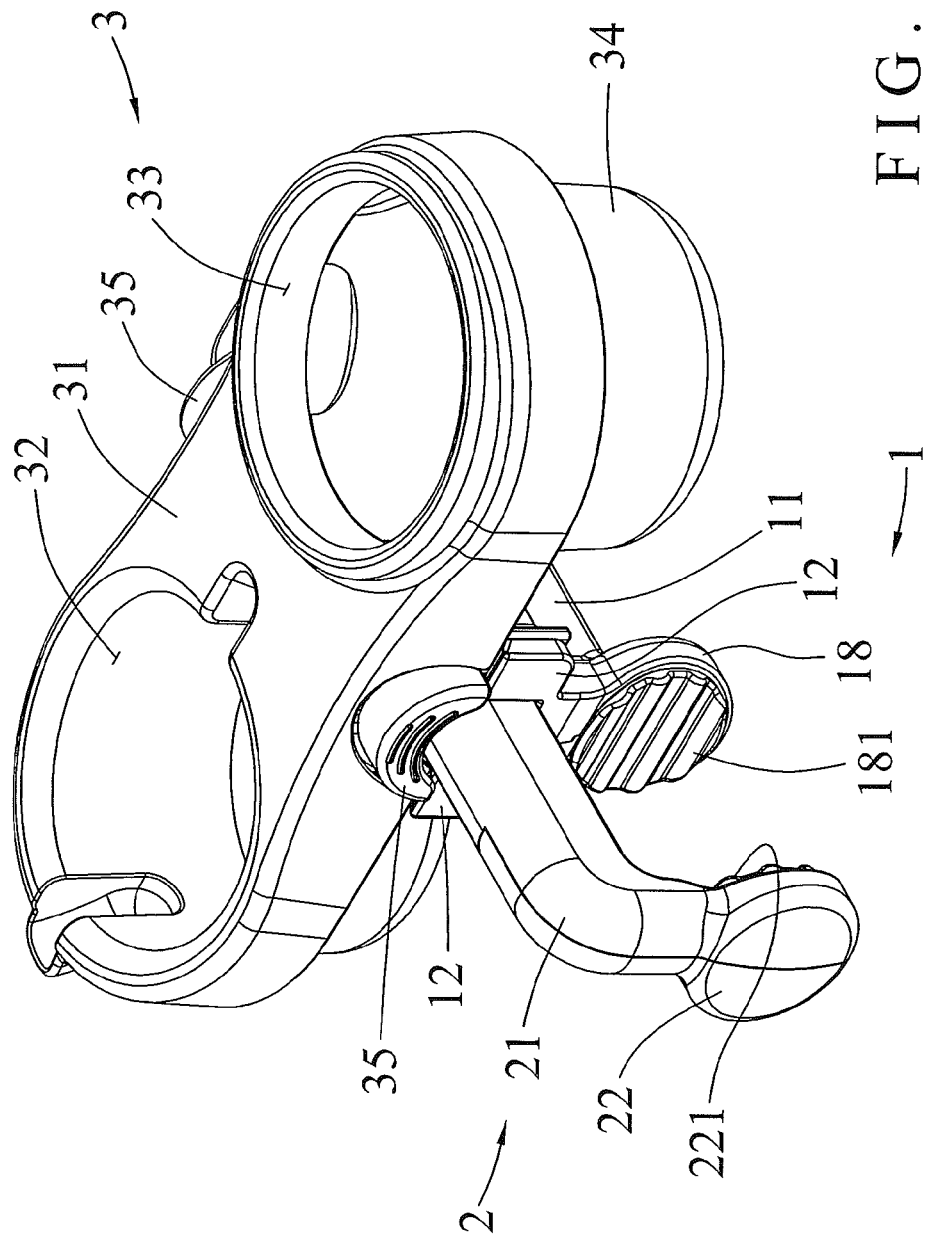
FIG. 1 is a perspective view of a cup holder in accordance with the preferred embodiment of the present invention.
Figure 2:
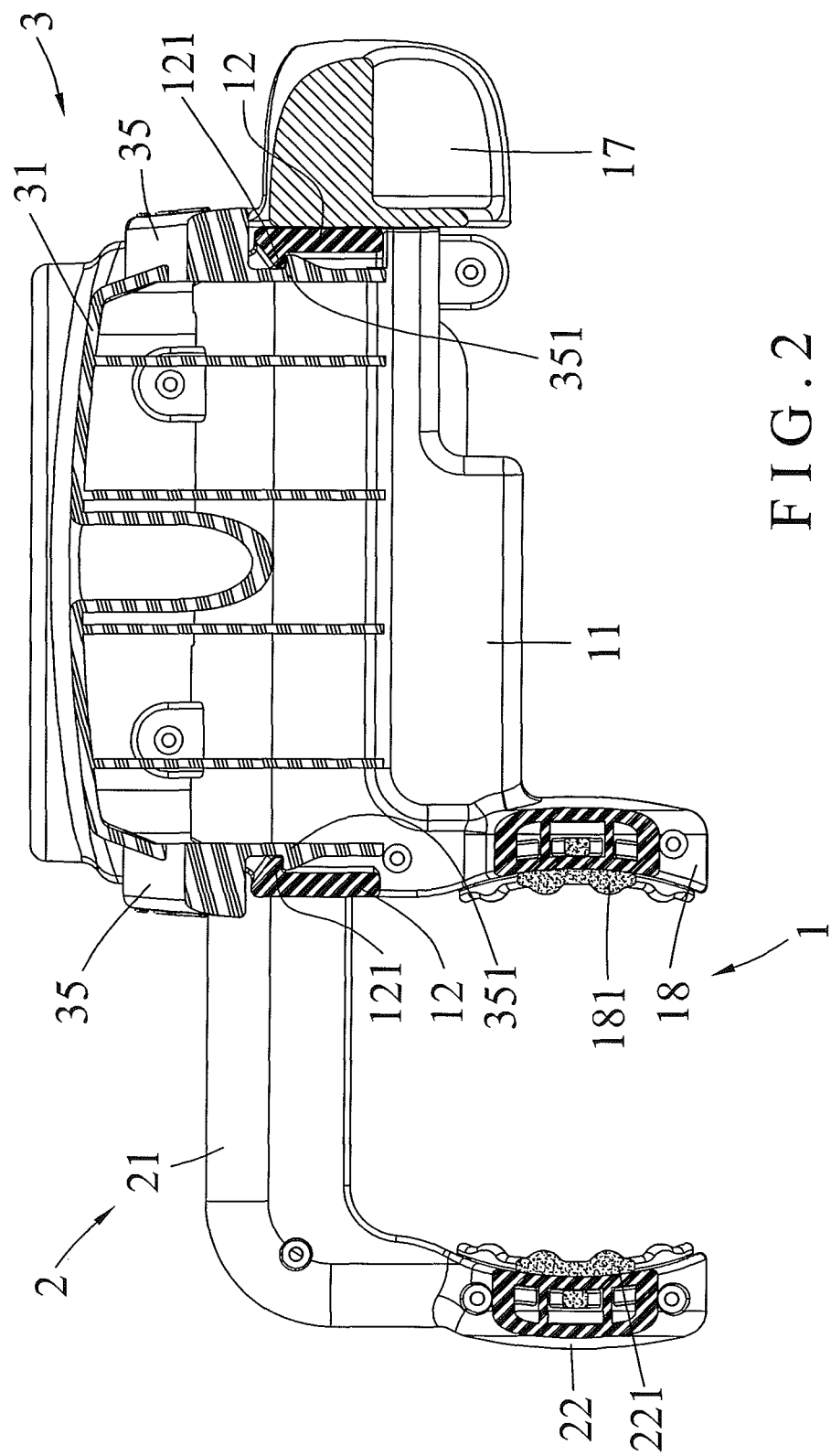
FIG. 2 is a cross-sectional view of the cup holder as shown in FIG. 1.
Figure 3:
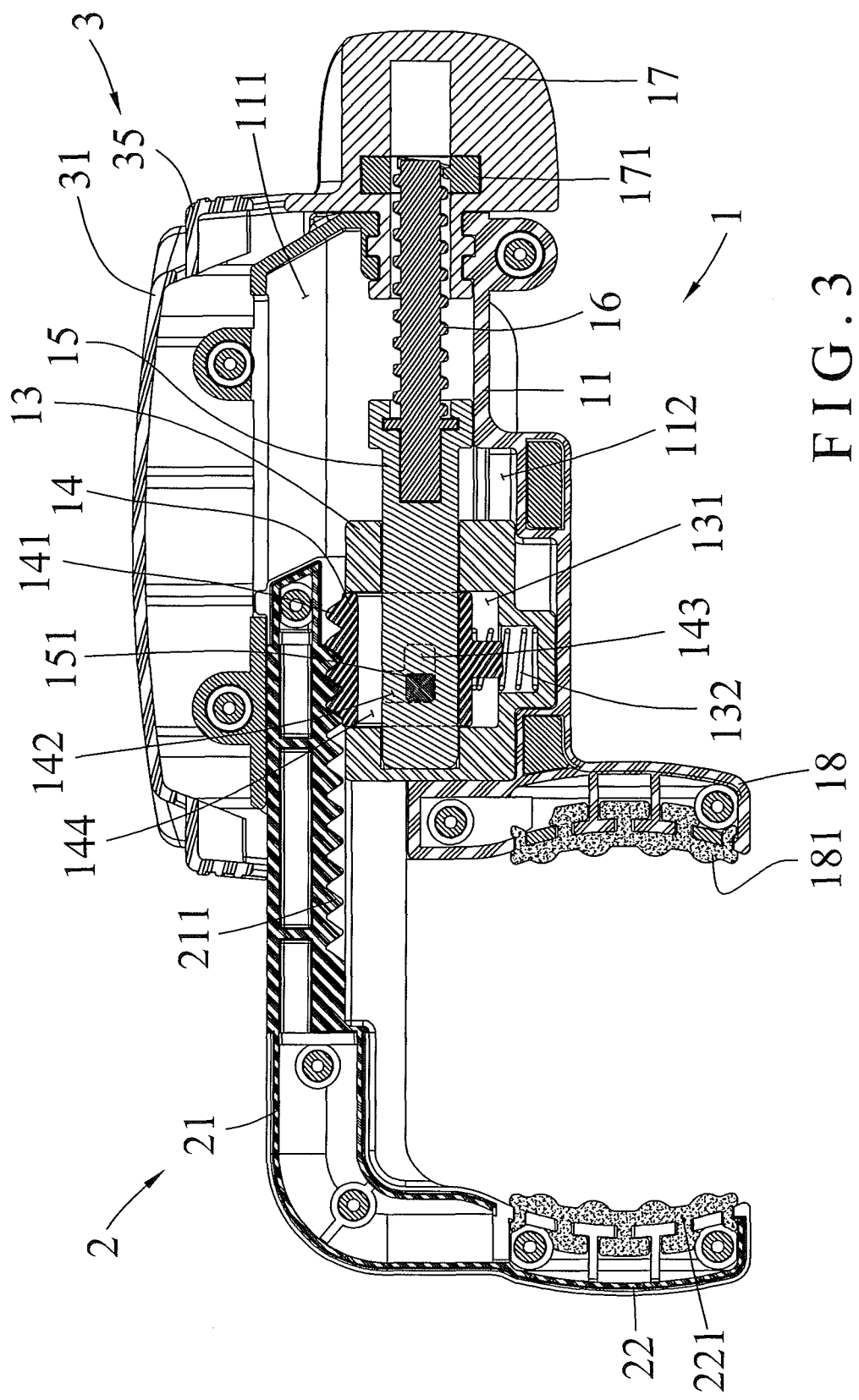
FIG. 3 is another cross-sectional view of the cup holder as shown in FIG. 1.
Figure 4:
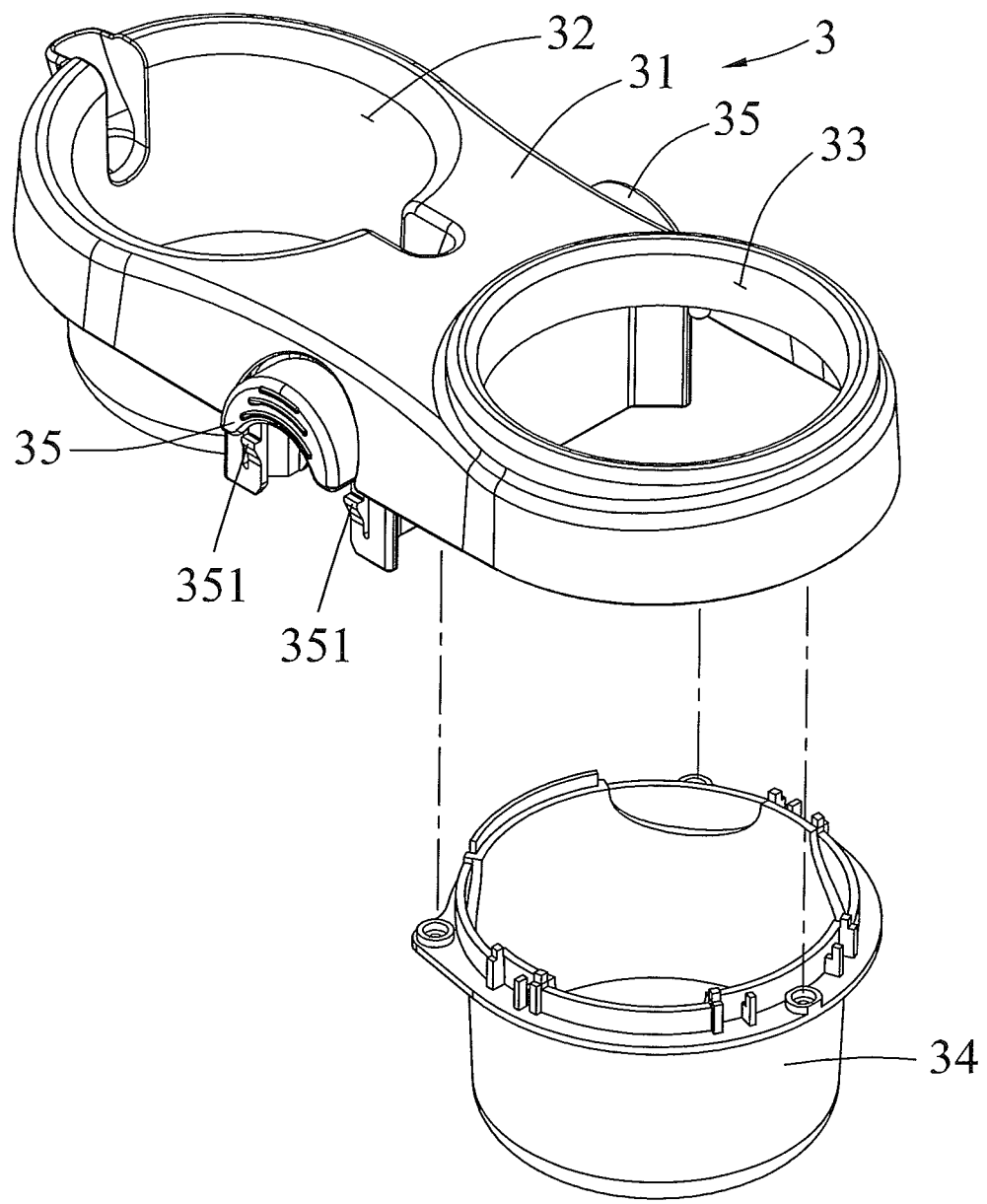
FIG. 4 is a partially exploded perspective view of the cup holder as shown in FIG. 1.

Referring to the drawings and initially to FIGS. 1-4, a cup holder in accordance with the preferred embodiment of the present invention comprises a fixed seat 1, a movable clamping bar 2 mounted on the fixed seat 1, and a support rack 3 mounted on the fixed seat 1.

The fixed seat 1 includes a base 11, a slide 13, a locking block 14, a pull rod 15, a threaded rod 16 and a rotation member 17. The base 11 has an end provided with a fixed clamping plate 18. The fixed clamping plate 18 of the base 11 has a side face provided with a fixed pad 181. The base 11 has two sides each provided with a positioning member 12 which has a protruding retaining end 121. The base 11 has an interior provided with a space 111 which has a bottom provided with a slideway 112. The slide 13 is slidably mounted on the slideway 112 and has a top provided with a recessed chamber 131. The locking block 14 is mounted in the chamber 131 of the slide 13. An elastic member 132 is biased between the locking block 14 and the chamber 131 of the slide 13 to push the locking block 14 upward. The locking block 14 has a top provided with a plurality of first locking teeth 141. The locking block 14 is provided with a longitudinal slot 142 and a transverse slot 143. The transverse slot 143 is located at a bottom of and connected to the longitudinal slot 142. Thus, the longitudinal slot 142 and the transverse slot 143 of the locking block 14 form a substantially L-shaped hole. The locking block 14 is transversely provided with a through hole 144. The pull rod 15 extends through and is movable in the through hole 144. A positioning piece 151 is transversely mounted on the pull rod 15 and is movable between the longitudinal slot 142 and the transverse slot 143. The threaded rod 16 is connected with a distal end of the pull rod 15. The rotation member 17 is pivotally mounted on the base 11 and has a screw member 171 screwed onto the threaded rod 16.

The movable clamping bar 2 includes a shank 21 having a first end inserted into a top of the space 111 of the base 11, and a movable clamping plate 22 extending downward from a second end of the shank 21 and facing the fixed clamping plate 18. The shank 21 has a bottom provided with a plurality of second locking teeth 211 meshing with the first locking teeth 141 of the locking block 14. The movable clamping plate 22 of the movable clamping bar 2 has a side face provided with a movable pad 221 facing the fixed clamping plate 18.

The support rack 3 includes a bracket 31 and a utensil 34 mounted on the bracket 31. The bracket 31 is provided with at least one receiving recess 32 and at least one opening 33 for placing bottles, cups, bowls and the like. The bracket 31 has a mediate section having two sides each provided with a press button 35 which has a protruding tenon 351 locked onto the retaining end 121 of the respective positioning member 12 of the base 11. Preferably, the bracket 31 is provided with a plurality of receiving recesses 32 and a plurality of openings 33, and the receiving recesses 32 and the openings 33 of the bracket 31 are arranged in an alternating manner. The utensil 34 is combined with a bottom of the at least one opening 33 of the bracket 31 by a plurality of screws so that the utensil 34 can be removed freely from the bracket 31.

Figure 5:
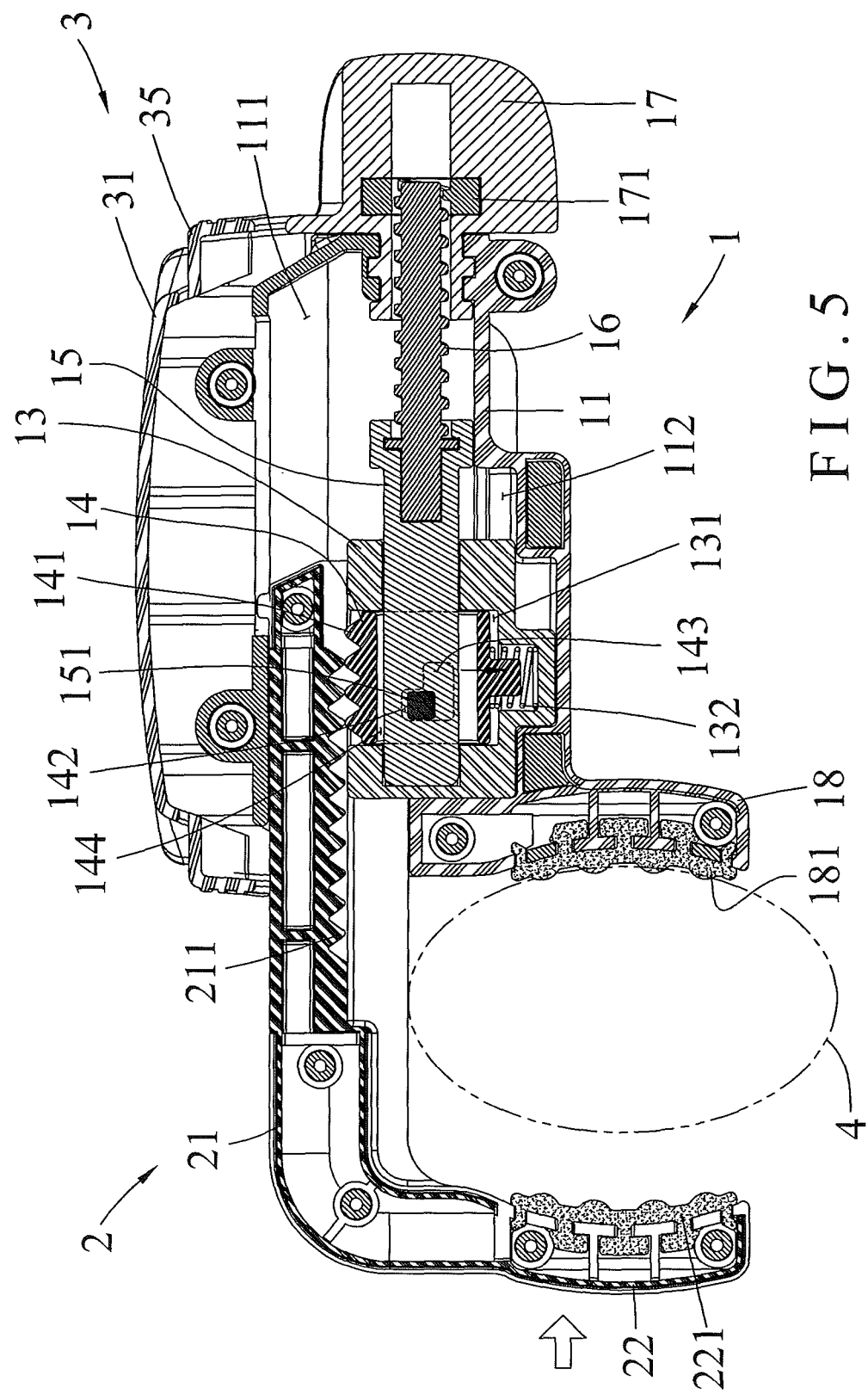
FIG. 5 is a schematic operational view of the cup holder as shown in FIG. 3.
Figure 6:
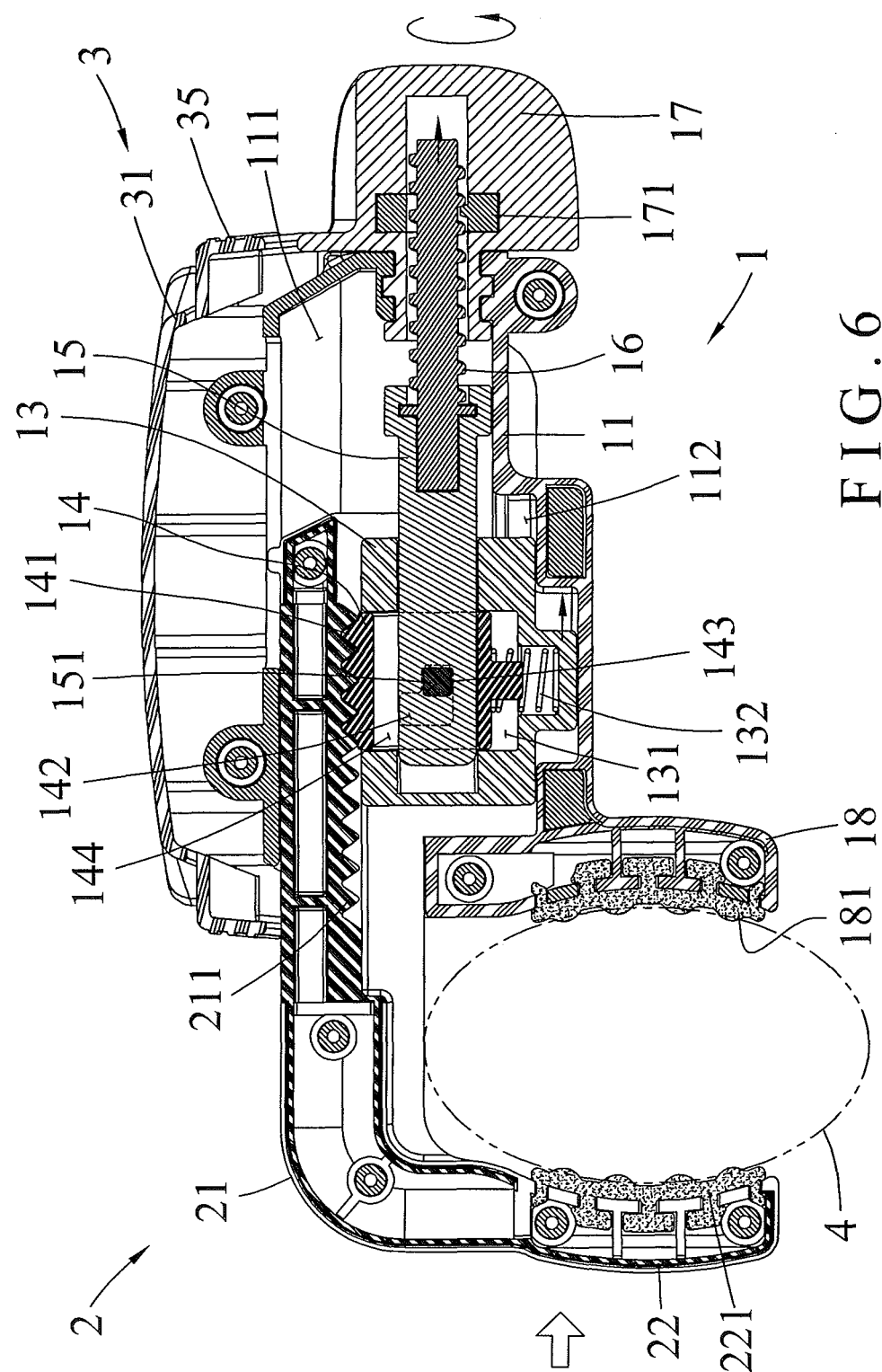
FIG. 6 is a schematic operational view of the cup holder as shown in FIG. 5.

In operation, referring to FIGS. 5 and 6 with reference to FIGS. 1-4, the shank 21 of the movable clamping bar 2 is moved outward from the space 111 of the base 11 to allow entrance of a rail 4 of a baby stroller between the movable clamping plate 22 and the fixed clamping plate 18 as shown in FIG. 5. Then, the shank 21 of the movable clamping bar 2 is pushed toward the base 11 to move the movable clamping plate 22 to touch the rail 4 so that the rail 4 is clamped between the movable clamping plate 22 and the fixed clamping plate 18 as shown in FIG. 6. When the shank 21 of the movable clamping bar 2 is pushed toward the base 11, the second locking teeth 211 of the shank 21 successively push the first locking teeth 141 of the locking block 14 as shown in FIG. 5 so that the locking block 14 is pushed downward successively, while the elastic member 132 pushes the locking block 14 upward successively, so that the first locking teeth 141 of the locking block 14 again mesh with the second locking teeth 211 of the shank 21 as shown in FIG. 6 so as to restrict the shank 21. When the locking block 14 is pushed downward by the shank 21 and is pushed upward by the elastic member 132, the positioning piece 151 slides in the longitudinal slot 142, without obstructing movement of the locking block 14. When the rotation member 17 is rotated, the screw member 171 is screwed on and rotated relative to the threaded rod 16 so that the threaded rod 16 is moved toward the rotation member 17, and the pull rod 15 is driven by the threaded rod 16 and is moved backward, such that the positioning piece 151 on the pull rod 15 slides into the transverse slot 143 of the locking block 14 as shown in FIG. 6. Thus, the locking block 14 is locked by the positioning piece 151, so that the first locking teeth 141 of the locking block 14 engage the second locking teeth 211 of the shank 21 so as to lock the shank 21 by the locking block 14. When the rotation member 17 is rotated successively, the pull rod 15 drives the slide 13 to move backward in the space 111 along the slideway 112 to move the locking block 14 backward which moves the shank 21 backward to slightly shorten the distance between the movable clamping plate 22 and the fixed clamping plate 18 to achieve a micro-adjustment tightening effect, so that the rail 4 is clamped exactly and solidly between the movable clamping plate 22 and the fixed clamping plate 18.

Figure 7:
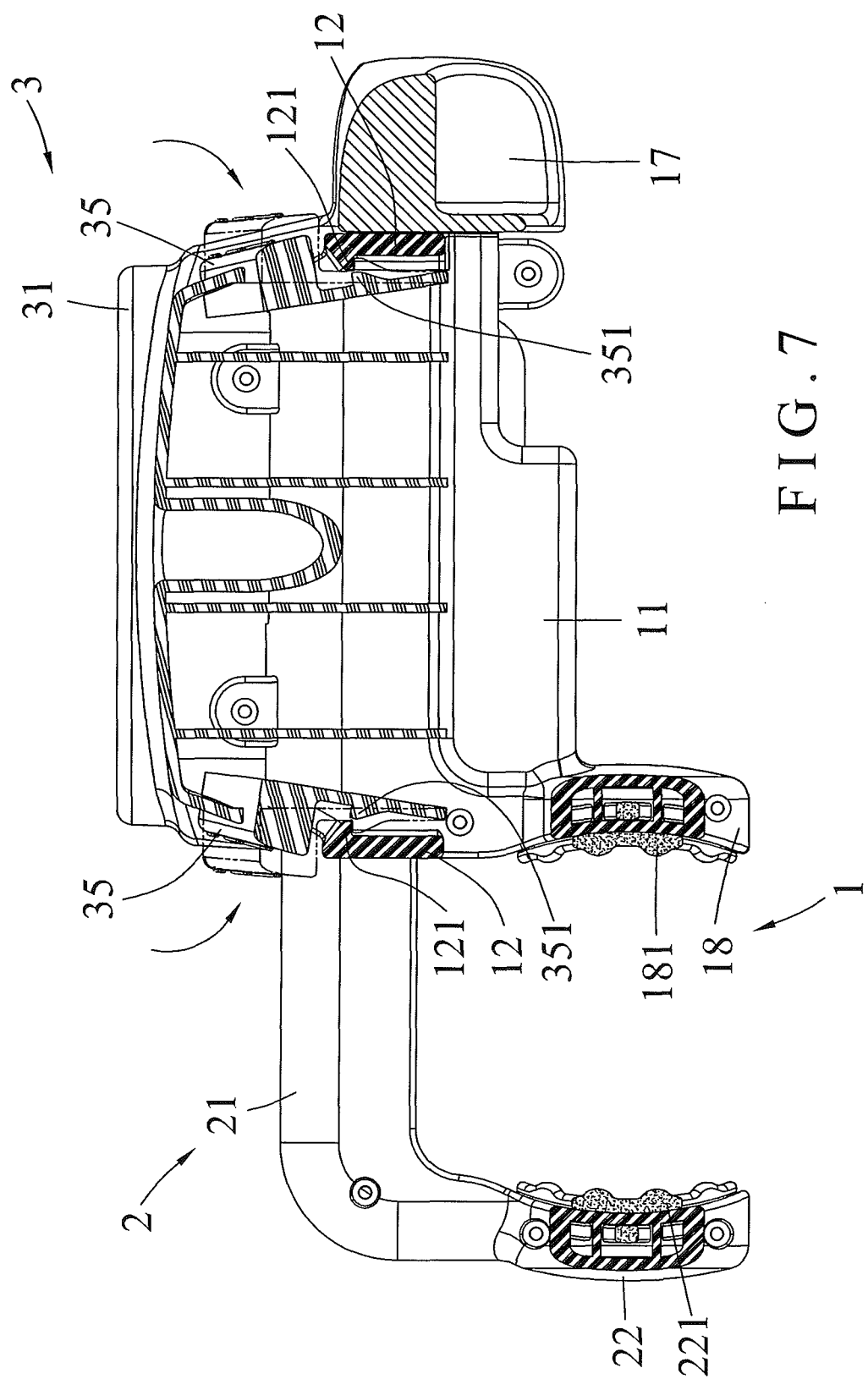
FIG. 7 is a schematic operational view of the cup holder as shown in FIG. 3.
Figure 8:
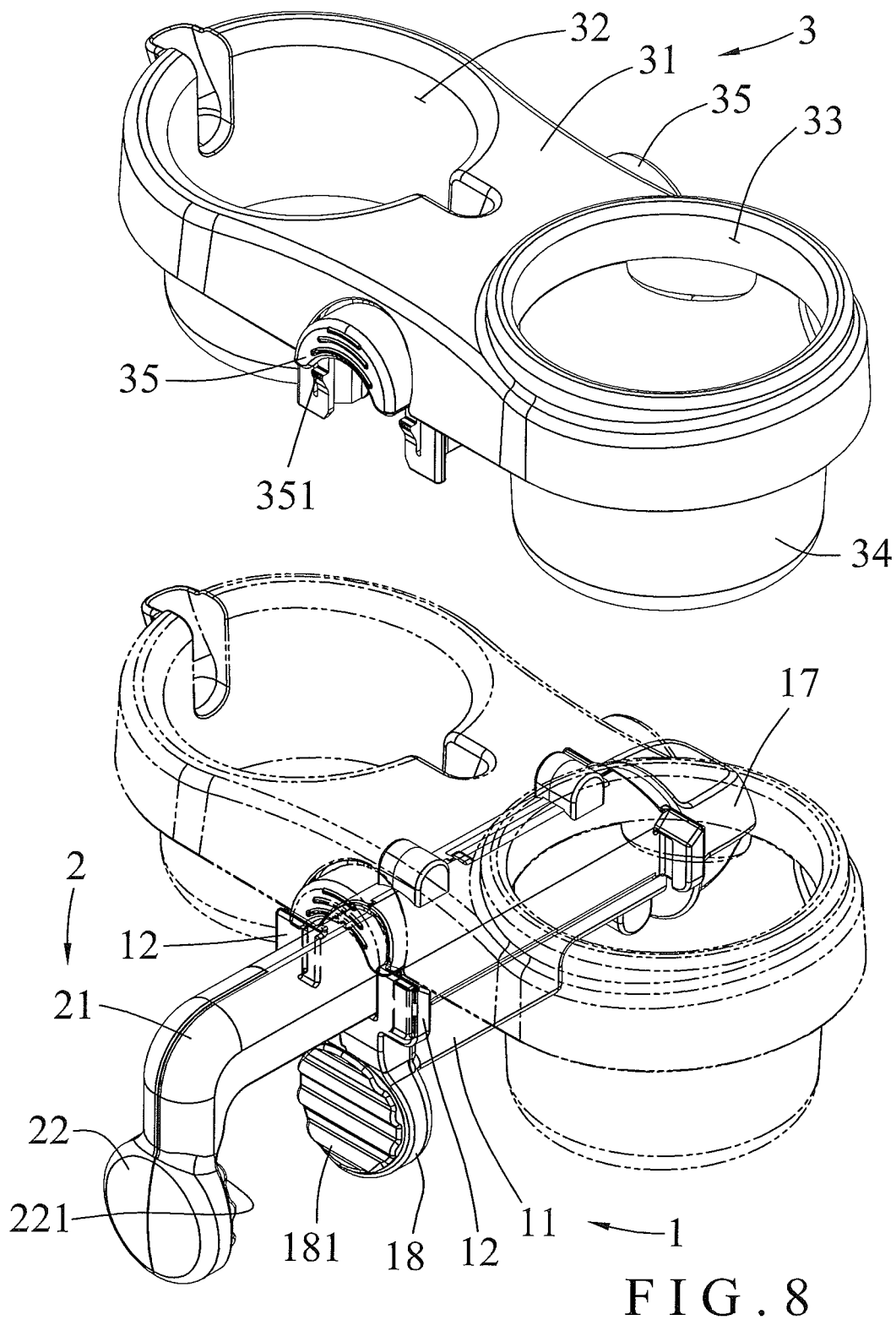
FIG. 8 is a perspective operational view of the cup holder as shown in FIG. 1, showing detachment of the support rack and the fixed seat.

In detachment, referring to FIGS. 7 and 8 with reference to FIGS. 1-4, when the press button 35 at each of the two sides of the bracket 31 is pressed inward, the protruding tenon 351 of the press button 35 of the bracket 31 is detached from the retaining end 121 of the respective positioning member 12 of the base 11, so that the bracket 31 is unlocked and can be removed from the base 11.

Accordingly, the shank 21 of the movable clamping bar 2 is pushed to sandwich the rail 4 of the baby stroller between the movable clamping plate 22 and the fixed clamping plate 18, and the rotation member 17 is rotated to drive the positioning piece 151 to lock the locking block 14, so that the rail 4 is clamped between the movable clamping plate 22 and the fixed clamping plate 18. In addition, the user only needs to push the movable clamping bar 2 and rotate the rotation member 17 so as to lock the cup holder onto the rail 4 of the baby stroller so that the cup holder is attached to the baby stroller easily, quickly and conveniently. Further, the cup holder is mounted on and detached from the baby stroller freely.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A cup holder comprising:
a fixed seat;
a movable clamping bar mounted on the fixed seat; and
a support rack mounted on the fixed seat;
wherein:
the fixed seat includes a base, a slide, a locking block, a pull rod, a threaded rod and a rotation member;
the base has an end provided with a fixed clamping plate;
the base has two sides each provided with a positioning member which has a protruding retaining end;
the base has an interior provided with a space which has a bottom provided with a slideway;
the slide is mounted on the slideway and has a top provided with a recessed chamber;
the locking block is mounted in the chamber of the slide;
an elastic member is biased between the locking block and the chamber of the slide to push the locking block upward;
the locking block has a top provided with a plurality of first locking teeth;
the locking block is provided with a longitudinal slat and a transverse slot;
the transverse slot is located at a bottom of and connected to the longitudinal slot;
the locking block is transversely provided with a through hole;
the pull rod extends through the through hole;
a positioning piece is transversely mounted on the pull rod and is movable between the longitudinal slot and the transverse slot;
the threaded rod is connected with a distal end of the pull rod;
the rotation member is pivotally mounted on the base and has a screw member screwed onto the threaded rod;
the movable clamping bar includes a shank having a first end inserted into a top of the space of the base, and a movable clamping plate extending downward from a second end of the shank and facing the fixed clamping plate;
the shank has a bottom provided with a plurality of second locking teeth meshing with the first locking teeth of the locking block;

the support rack includes a bracket provided with at least one receiving recess and at least one opening; and the bracket has two sides each provided with a press button which has a protruding tenon locked onto the retaining end of the respective positioning member of the base.

2. The cup holder of claim 1, wherein the fixed clamping plate of the base has a side face provided with a fixed pad.

3. The cup holder of claim 1, wherein the movable clamping plate of the movable clamping bar has a side face provided with a movable pad facing the fixed clamping plate.

4. The cup holder of claim 1, wherein the bracket is provided with a plurality of receiving recesses and a plurality of openings, and the receiving recesses and the openings of the bracket are arranged in an alternating manner.

5. The cup holder of claim 1, wherein the support rack further includes a utensil mounted on the bracket, and the utensil is combined with a bottom of the at least one opening of the bracket by a plurality of screws.

\* \* \* \* \*